United States Patent
Zhang et al.

(10) Patent No.: US 11,758,496 B2
(45) Date of Patent: *Sep. 12, 2023

(54) TRANSMISSION AND RECEIPT PROCESSING METHOD AND DEVICE FOR TIME-FREQUENCY SYNCHRONIZATION BETWEEN V2X TERMINALS

(71) Applicant: Samsung Electronics Co., Ltd., Gyeonggi-do (KR)

(72) Inventors: Shichang Zhang, Beijing (CN); Yingyang Li, Beijing (CN); Yi Wang, Beijing (CN)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/686,872

(22) Filed: Mar. 4, 2022

(65) Prior Publication Data
US 2022/0191811 A1 Jun. 16, 2022

Related U.S. Application Data

(63) Continuation of application No. 16/889,118, filed on Jun. 1, 2020, now Pat. No. 11,272,470, which is a (Continued)

(30) Foreign Application Priority Data

| Feb. 5, 2016 | (CN) | 201610082590.6 |
| May 12, 2016 | (CN) | 201610313041.5 |
| Dec. 1, 2016 | (CN) | 201611090382.7 |

(51) Int. Cl.
H04W 56/00 (2009.01)
H04W 76/14 (2018.01)
(Continued)

(52) U.S. Cl.
CPC ......... *H04W 56/0015* (2013.01); *H04W 4/40* (2018.02); *H04W 56/002* (2013.01);
(Continued)

(58) Field of Classification Search
CPC ... H04W 84/18; H04W 56/0015; H04W 4/40; H04W 48/12; H04W 76/14; H04W 56/002; H04W 84/00; H04W 56/00
(Continued)

(56) References Cited

U.S. PATENT DOCUMENTS 9,433,294 B2 * 9/2016 Donovan ............. A47C 7/5068
9,654,242 B2 * 5/2017 Cao ....................... H04J 3/0679
(Continued)

FOREIGN PATENT DOCUMENTS

| WO | WO 2014/169458 | 10/2014 |
| WO | WO 2016/013826 | 1/2016 |
| WO | WO 2016/018068 | 2/2016 |

OTHER PUBLICATIONS

PCT/ISA/210 Search Report dated May 8, 2017 issued on PCT/KR2017/001015 (pp. 3).
(Continued)

*Primary Examiner* — Man U Phan
(74) *Attorney, Agent, or Firm* — The Farrell Law Firm, P.C.

(57) ABSTRACT

Provided are a communication method and system for converging a 5th-Generation (5G) communication system for supporting higher data rates beyond a 4th-Generation (4G) system with a technology for Internet of Things (IoT), with a transmission and receipt processing method and device for time-frequency synchronization between V2X terminals. When a synchronization signal to be transmitted is identical to a synchronization signal of an existing D2D terminal, time-frequency resources configured for the D2D
(Continued)

By a VUE, detect a synchronization signal, and determine a synchronization source type corresponding to the synchronization signal according to the detected synchronization signal — 210

Select, by the VUE, a synchronization source which can be detected and has a highest priority as a reference synchronization source — 220 terminal in a cell are reused to transmit the synchronization signal. When synchronization signal to be transmitted is different from a synchronization signal of an existing D2D terminal, reconfigured time-frequency resources are used to transmit the synchronization signal. The synchronization signal transmitted by a V2X terminal indicates a corresponding synchronization source type by using a value of an SLSS sequence index and/or a value of a PSBCH specified field.

14 Claims, 4 Drawing Sheets

Related U.S. Application Data continuation of application No. 16/074,637, filed as application No. PCT/KR2017/001015 on Jan. 31, 2017, now abandoned.

(51) Int. Cl.
*H04W 4/40* (2018.01)
*H04W 84/00* (2009.01)
*H04W 48/12* (2009.01)
*H04W 84/18* (2009.01)

(52) U.S. Cl.
CPC ........... *H04W 76/14* (2018.02); *H04W 84/00* (2013.01); *H04W 48/12* (2013.01); *H04W 84/18* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 9,693,338 | B2* | 6/2017 | Zhao | H04W 72/02 |
| 10,383,096 | B2* | 8/2019 | Lee | H04W 76/14 |
| 10,425,915 | B2* | 9/2019 | Sheng | H04W 72/02 |
| 10,433,294 | B2* | 10/2019 | Chae | H04W 4/70 |
| 10,548,106 | B2* | 1/2020 | Chae | H04L 5/0048 |
| 10,652,846 | B2* | 5/2020 | Khoryaev | H04W 56/0015 |
| 10,869,288 | B2* | 12/2020 | Yang | H04W 56/0045 |
| 11,272,470 | B2* | 3/2022 | Zhang | H04W 56/0015 |
| 11,310,007 | B2* | 4/2022 | Shin | H04W 72/20 |
| 11,425,671 | B2* | 8/2022 | Lee | H04W 56/0015 |
| 2015/0264588 | A1 | 9/2015 | Li et al. | |
| 2015/0327201 | A1* | 11/2015 | He | H04W 48/16 370/336 |
| 2016/0065322 | A1 | 3/2016 | Cao et al. | |
| 2017/0171690 | A1 | 6/2017 | Kim et al. | |
| 2017/0181150 | A1 | 6/2017 | Lee et al. | |
| 2017/0280406 | A1* | 9/2017 | Sheng | H04W 4/40 |
| 2018/0160382 | A1* | 6/2018 | Hou | H04W 4/00 |
| 2018/0213498 | A1* | 7/2018 | Khoryaev | H04B 7/2684 |
| 2018/0213499 | A1* | 7/2018 | Lee | H04W 56/002 |
| 2018/0220388 | A1* | 8/2018 | Chae | H04W 76/14 |
| 2018/0242263 | A1* | 8/2018 | Lee | H04W 72/12 |
| 2019/0069255 | A1* | 2/2019 | Zhao | H04W 56/00 |
| 2019/0141652 | A1* | 5/2019 | Ko | H04W 72/23 |
| 2020/0229114 | A1* | 7/2020 | Ryu | H04L 27/2613 |
| 2020/0344709 | A1* | 10/2020 | Khoryaev | H04W 56/0015 |

OTHER PUBLICATIONS

PCT/ISA/237 Written Opinion dated May 8, 2017 issued on PCT/KR2017/001015 (pp. 5).
European Search Report dated Jul. 26, 208 issued in counterpart application No. 17747695.9 (pp. 10).
Sun, Wanlu et al., Resource Sharing and Power Allocation for D2D-based Safety-Critical V2X Communications, 2015 IEEE International Conference on Communication Workshop (ICCW), (pp. 9).
Ericsson: Distributed Synchronization Procedure for V2X over PC5, 3GPP TSG RAN WG1 Meeting #83, R1-157369, Anaheim, USA, Nov. 15-22, 2015, (pp. 6).
CATT: Considerations on synchronization signal/channel Enhancement, 3GPP TSG RAN WG1 Meeting #83, R1-156606, Anaheim, USA, Nov. 15-22, 2015 (pp. 3).
LG Electronics: Discussion on synchronization enhancements for PC5-based V2V, 3GPP TSG RAN WG1 Meeting #82bis, R1-155419, Malmo, Sweden, Oct. 5-9, 2015, (pp. 3).
CATT, "Synchronization Enhancements in PC5-based V2V", R1-156603, 3GPP TSG RAN WG1 Meeting # 83, Nov. 15-22, 2015, 8 pages.
ZTE, "Synchronization for V2V", R1-156661, 3GPP TSG-RAN WG1 Meeting #83, Nov. 15-22, 2015, 6 pages.
Ericsson, "General Discussion on V2X-PC5 Synchronization", R1-157367, 3GPP TSG RAN WG1 Meeting #83, Nov. 16-20, 2015, 6 pages.
European Search Report dated May 18, 2020 issued in counterpart Appln. No. 20155964.8-1205, 12 pages.
LG Electronics, "Discussion on Synchronization Enhancement for PC5-based V2V", R1-156895, 3GPP TSG RAN WG1 Meeting #83, Nov. 15-22, 2015, 7 pages.
European Search Report dated Jul. 9, 2021 issued in counterpart Appln. No. 20155964.8-1205, 8 pages.

* cited by examiner

TRANSMISSION AND RECEIPT PROCESSING METHOD AND DEVICE FOR TIME-FREQUENCY SYNCHRONIZATION BETWEEN V2X TERMINALS

PRIORITY

This application is a Continuation of U.S. patent application Ser. No. 16/889,118, which was filed in the U.S. Patent and Trademark Office (USPTO) on Jun. 1, 2020, issued as U.S. Pat. No. 11,272,470 on Mar. 8, 2022, which is a Continuation of U.S. patent application Ser. No. 16/074,637, which was filed in the USPTO on Aug. 1, 2018, which is a National Phase Entry of PCT International Application No. PCT/KR2017/001015, which was filed on Jan. 31, 2017, and claims priority to Chinese Patent Application Nos. 201610082590.6, 201610313041.5, and 201611090382.7, which were filed on Feb. 5, 2016, May 12, 2016, and Dec. 1, 2016, respectively, the entire content of each of which is incorporated herein by reference.

BACKGROUND

1. Field

The present application relates to the technical field of mobile communications, and in particular to a transmission and receipt processing method and device for time-frequency synchronization between V2X terminals in a Vehicle to Vehicle/Pedestrian/Infrastructure/Network (V2X) communication system.

2. Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MINO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

At present, due to its great potential value in the public safety field and the ordinary civil communication field, the Device to Device (D2D) communication technology has been accepted by the 3rd Generation Partnership Project (3GPP) standards, and has realized the standardization of a part of functions in the 3GPP Rel-12, including the mutual discovery of D2D terminals in a In Coverage (IC) scenario, and the broadcast communications between D2D terminals in an IC scenario, a Partial Coverage (PC) scenario and an Out of Coverage (OC) scenario.

In accordance with the conclusions from the 3GPP at present, for User Equipments (UEs) participating in the D2D mutual discovery, in order to realize the subframe-level synchronization between D2D terminals in different cells, when a UE transmitting a D2D discovery signal receives a signaling indication from an eNB or located on the edge of a cell, the UE needs to transmit a Sidelink Synchronization Signal (SLSS) on a synchronization resource configured by the cell, where the SLSS comprises a Primary Sidelink Synchronization Signal (PSSS) and a Secondary Sidelink Synchronization Signal (SSSS). The PSSS uses a Zadoff-Chu (ZC) sequence with a length of 62, and root sequence indexes of 26 and 37. The SSSS consists of two m-sequences each having a length of 31, and the two m-sequences are uniquely determined by an index corresponding to the SSSS (an SSSS index for short hereinafter). For UEs participating in a D2D broadcast communication, in order to realize the subframe-level synchronization between a UE transmitting a broadcast signal and a UE receiving the broadcast signal, when a UE transmitting a broadcast communication signal and locating in coverage of a cell (ICUE) receives a signaling indication from an eNB or located on the edge of the cell, the UE needs to transmit an SLSS on a synchronization resource configured by the cell. In addition, in order to enable an Out of Coverage UE (OCUE) to acquire system frames, system bandwidth, Time Division Duplex (TDD) configuration or other information of the cell, the ICUE transmitting the broadcast communication signal needs to transmit a Physical Sidelink Broadcast Channel (PSBCH), so as to forward the information to the OCUE.

The D2D synchronization resource has a period of 40 ms, and by using a cell carrier frequency as a center, occupies six Physical Resource Blocks (PRBs) having a length of one subframe. Wherein, the SLSS occupies four Frequency Division Multiple Access (SC-FDMA) symbols in the subframe, and the remaining symbols are used for PSBCH transmission expect that the last Single Carrier Frequency Division Multiple Access (SC-FDMA) symbol in the subframe is used for the guard interval. SLSSs from the UEs for D2D mutual discovery and the UEs for D2D broadcast communication share the synchronization resources for SLSSs. In other words, on a part of SLSS synchronization resources, if both a discovering UE and a communication UE satisfy the conditions for transmitting SLSSs, the SLSSs from the two UEs will be accumulated on a same time-frequency resource.

An OCUE participating in the D2D broadcast communication needs to select a D2D synchronization source according to the intensity of D2D synchronization signals from D2D synchronization sources. As there may be an SLSS from the discovering UE on the SLSS resource, the OCUE will measure the intensity of the synchronization signal based on a demodulation reference signal (DMRS) of the PSBCH.

Since the standardized D2D communication in the 3GPP Rel-12/13 is mainly specific to low-speed terminals, as well as services having lower requirements on the time delay sensitivity and receiving reliability, the realized D2D functions are far unable to meet the user demands. Accordingly, in the subsequent 3GPP releases, further enhancing the functional framework of D2D has become a broad consensus for various communication terminal manufacturers and communication network equipment manufacturers nowadays. Wherein, based on the current D2D broadcast communication mechanism, supporting low-delay and high-reliability direct communications between high-speed equipments, between a high-speed equipment and a low-speed equipment and between a high-speed equipment and a static equipment (e.g., Vehicle to Vehicle/Pedestrian/Infrastructure/Network (V2X)) is one of functions to be standardized preferentially.

At present, the 3GPP has defined V2X services that need to be supported, and these services are based on a geographical location of a UE supporting the V2X communication services (herein called a V2X terminal, also referred to as a VUE). In other words, the VUE has the capacity of receiving Global Navigation Satellite System (GNSS) signals (including equivalent GNSS signals). Thus, the VUE not only can realize time-frequency synchronization via an eNB, but also can realize time-frequency synchronization via a crystal oscillator trained by a GNSS signal. In addition, in an actual traffic environment, there is a cellular network and GNSS coverage blind region, for example, a tunnel, an underground parking or more. In order to support V2X communication services in such an environment, the VUE needs to forward synchronization signals based on the eNB or the GNSS. Therefore, in a V2X communication environment, there has been no mature implementation scheme about how to realize the transmission and receipt of time-frequency synchronization between V2X terminals nowadays.

SUMMARY

An objective of the present application is to solve at least one of the technical defects described above, and particularly to provide a transmission and receipt processing method for time-frequency synchronization between V2X terminals and a corresponding device.

Accordingly, an aspect of the present disclosure provides a method performed by a terminal capable of vehicle to everything (V2X) communication in a wireless communication system, the method including identifying configuration information for the V2X communication including synchronization priority information, wherein the synchronization priority information is set to a global navigation satellite system (GNSS) or a base station; receiving a plurality of synchronization signals; and selecting a synchronization reference from the plurality of synchronization signals, based on the synchronization priority information.

Another aspect of the present disclosure provides a terminal capable of vehicle to everything (V2X) communication in a wireless communication system, with the terminal including a transceiver and at least one processor, which is configured to identify configuration information for the V2X communication including synchronization priority information, wherein the synchronization priority information is set to a global navigation satellite system (GNSS) or a base station; control the transceiver to receive a plurality of synchronization signals; and select a synchronization reference from the plurality of synchronization signals, based on the synchronization priority information.

For a V2X terminal transmitting a synchronization signal, if the synchronization signal transmitted by the V2X terminal is identical to that of an existing D2D terminal, time-frequency resources configured for transmitting the D2D synchronization signal in a cell are reused to transmit the synchronization signal, and an SLSS sequence is identical to that of the D2D terminal; in contrast, the V2X terminal redefines or reconfigures tine-frequency resources to transmit the synchronization signal, and uses a redefined or reconfigured synchronization sequence, where the used synchronization resources and synchronization sequence are different from the time-frequency resources and synchronization sequence used by the D2D terminal to transmit the synchronization signal. In the two modes, reference synchronization source types are distinguished by reserved bits in a PSBCH. For a V2X terminal receiving a synchronization signal, synchronization source types are determined according to the received synchronization signal, and a reference synchronization source is further selected in an established priority according to the detected synchronization sources. In accordance with the methods provided by the embodiments, the time-frequency synchronization between terminals in a V2X communication environment can be supported at a smallest standard alteration.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
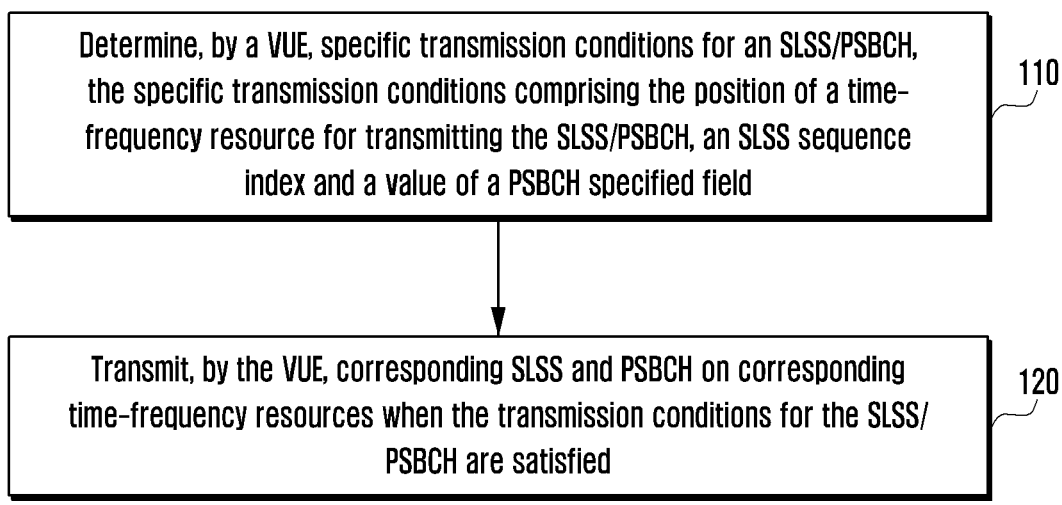
FIG. 1 is an implementation flowchart of a method for transmitting a synchronization signal according to the present application.

To make the objectives, technical solutions and advantages of the present application clearer, the present application will be further described below in details by embodiments with reference to the accompanying drawings.

First, there are mainly following three problems in a V2X communication environment: in which case a V2X terminal should forward a synchronization signal from an eNB or a GNSS; on which physical resource and in which synchronization sequence the V2X terminal should bear the transmitted synchronization signal; and, for a V2X terminal receiving the synchronization signal in the V2X communication environment, which synchronization signal should be prioritized to realize synchronization in different circumstances.

In the V2X communication environment, due to the introduction of the GNSS, a V2X terminal needs a new method to select an optimal synchronization source to realize time-frequency synchronization in different circumstances. However, in order to support V2X terminals in a cellular network and GNSS coverage blind region to perform V2X communication, a V2X terminal in the cellular network or GNSS coverage needs a new method to forward time-frequency information from the eNB or the GNSS. In order to solve the problems described above, the present application provides a transmission and receipt processing method for realizing time-frequency synchronization between V2X terminals.

Wherein, the critical technical solutions of the transmission processing method for time-frequency synchronization between V2X terminals are as follows:

when a synchronization signal to be transmitted by a V2X terminal is identical to a synchronization signal of an existing D2D terminal, reusing time-frequency resources configured for transmission of the synchronization signal by the D2D terminal in a cell to transmit the synchronization signal;

when a synchronization signal to be transmitted by the V2X terminal is different from a synchronization signal of an existing D2D terminal, using reconfigured time-frequency resources to transmit the synchronization signal, wherein, in a preferred embodiment, when the synchronization signal to be transmitted by the V2X terminal is different from the synchronization signal of the existing D2D terminal, an SLSS sequence in the synchronization signal is different from that in the synchronization signal of the existing D2D terminal; and in the synchronization signal transmitted by the V2X terminal, indicating a corresponding synchronization source type by using an SLSS sequence index and/or a value of a PSBCH specified field.

Correspondingly, the critical technical solutions of the receipt processing method for time-frequency synchronization between V2X terminals are as follows:

detecting a synchronization signal, and determining corresponding synchronization source types according to an SLSS sequence index and/or a value of a PSBCH specified field in the detected synchronization signal; and selecting, from the synchronization source types determined in the above step, a synchronization source type having a highest priority as a reference synchronization source according to a specified synchronization source priority.

Hereinafter, the V2X terminal is called a VUE for short, for the purpose of description.

As shown in FIG. 1, if a VUE is used as a transmitting terminal in the time-frequency synchronization between VUEs, the method for transmitting a synchronization signal (including an SLSS and a PSBCH) by the VUE chronologically comprises the following steps.

Step 110: By a VUE, specific transmission conditions for the SLSS/PSBCH are determined, the specific transmission conditions comprising the position of a time-frequency resource for transmitting the SLSS/PSBCH, an SLSS sequence index (or a set of indexes of optional sequences) and a value of a PSBCH specified field.

There are two specific cases here.

In the first case, the VUE attempts to receive an indication signaling of information about the specific transmission conditions from an eNB. If the VUE can receive the indication signaling of information about the specific transmission conditions from the eNB, the VUE determines the information about the specific transmission conditions according to the received indication signaling from the eNB. The VUE that determines the specific transmission conditions according to the indication signaling from the eNB is called a controlled VUE herein. In the first case, the carrier frequency for the eNB can be identical to or different from the frequency at which the VUE performs V2X communication.

In the second case, if the VUE is unable to receive the indication signaling of information about the specific transmission conditions from the eNB, the VUE determines the information about the specific transmission conditions according to the pre-configuration. The VUE that determines the information about the specific transmission conditions according to the pre-configuration is called an autonomous VUE herein. Part of the information about the specific transmission conditions can be directly set by the standard.

Step 120: By the VUE, corresponding SLSS and PSBCH are transmitted on corresponding time-frequency resources when the transmission conditions for the SLSS/PSBCH are satisfied.

For an autonomous VUE, if the autonomous VUE is in a non-independent state, that is, if the autonomous VUE is synchronized to a reference synchronization source, PSSS and SSSS indexes (a PSSS index value and a PSSS root sequence index, similarly hereinafter) in the SLSS sequence index transmitted by the autonomous VUE are related to a sequence of a PSSS index and an SSSS index transmitted by the synchronization source referred by this VUE; and, if the autonomous VUE is in an independent state, that is, the autonomous VUE is not synchronized to any synchronization source, PSSS and SSSS sequences in the SLSS sequence index transmitted by this VUE are autonomously selected from a set of available sequences by the VUE.

Figure 2:
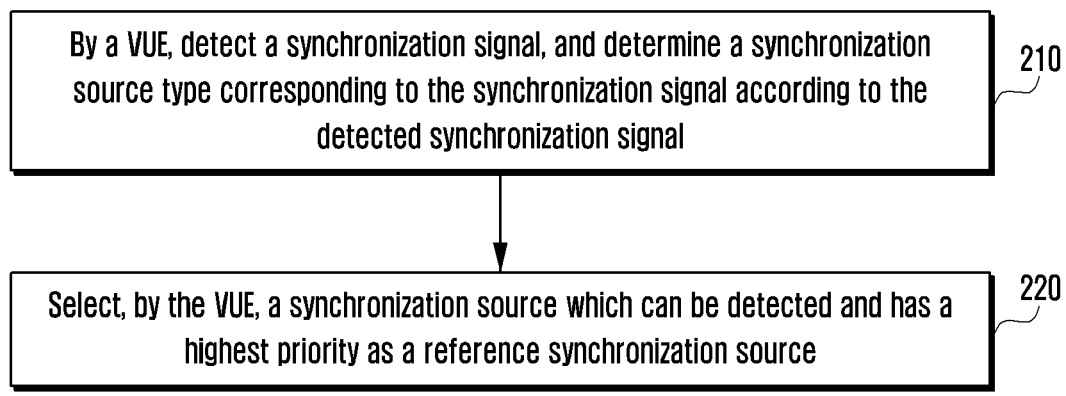
FIG. 2 is an implementation flowchart of a method for receiving a synchronization signal according to the present application.

As shown in FIG. 2, if a VUE is used as a receiving terminal in the time-frequency synchronization between VUEs, a method for selecting a reference synchronization source by the VUE comprises the following steps.

Step 210: By a VUE, a synchronization signal is detected, and synchronization sources types transmitting the synchronization signal are determined according to the detected synchronization signal.

The synchronization signal comprises a downlink synchronization signal transmitted by an eNB, a GNSS signal transmitted by a global navigation satellite, equivalent GNSS signals transmitted by other global navigation equipments, and SLSS and PSBCH signals transmitted by a VUE. If the synchronization signal is SLSS and PSBCH signals transmitted by a VUE, in the present invention, a corresponding synchronization source type needs to be determined according to an SLSS sequence index and/or a value of a PSBCH specified field contained therein.

The synchronization source type comprises: an eNB, a GNSS, a UE (which may be a VUE or a D2D terminal, similarly hereinafter) that directly uses an eNB as a reference synchronization source and is in coverage, a UE that directly uses a GNSS as a reference synchronization source and is in coverage, a UE that directly uses a GNSS as a reference synchronization source and is out of coverage, a UE that indirectly uses an eNB as a reference synchronization source, a UE that indirectly uses a GNSS as a reference synchronization source and is out of coverage, and an independent UE.

The expression "UE that directly uses an eNB or a GNSS as a reference synchronization source" means that the UE can receive a reliable synchronization signal transmitted by the eNB or the GNSS. The UE that indirectly uses an eNB or a GNSS as a reference synchronization source means that the UE can receive a reliable synchronization signal transmitted by an external UE and the external UE directly uses the eNB or the GNSS as a reference synchronization source. The independent UE refers to a UE transmitting a synchronization signal regularly according to its own crystal oscillator.

Step 220: By the VUE, a synchronization source that can be detected and has a highest priority is selected as a reference synchronization source.

The priority of the synchronization source may be related to the number of synchronization source types that can be detected by the VUE.

To easily understand the present application, the technical solutions of the present application will be further described below with reference to specific applications, by taking an inter-equipment interaction mode as an example.

EMBODIMENT 1

In Embodiment 1, the UE is a controlled VUE which acquires information about specific transmission conditions for transmitting an SLSS according to an indication from an eNB. The WE uses an eNB or a GNSS as a reference synchronization source, and transmits the SLSS by taking the eNB or the GNSS as reference. In order to reduce the influence on the cellular network communication and ensure the backward compatibility, the VUE reuses time-frequency resources configured for transmission of an SLSS by a D2D terminal in a cell, and uses the same synchronization sequence and PSBCH structure as the D2D terminal. Specific implementation steps are as follows.

Step 310: By a VUE, an indication signaling of information about specific transmission conditions transmitted by an eNB is received, and specific transmission conditions for an SLSS/PSBCH are determined according to the indication signaling, the specific transmission conditions comprising the position of a time-frequency resource for transmitting the SLSS/PSBCH, an SLSS sequence index and a value of a PSBCH specified field.

Step 320: By the VUE, corresponding SLSS and PSBCH are transmitted on corresponding time-frequency resources when the transmission conditions for the SLSS are satisfied.

In Embodiment 1, the time to transmit the synchronization signal by the NIUE is as follows: the VUE starts to transmit the SLSS and PSBCH when a value of the received Reference Signal Received Power (RSRP) relative to the eNB is lower than syncTxThreshIC, or when an SLSS transmission indication from the eNB is received by the VUE. Wherein, the VUE determines the value of the syncTxThreshIC by receiving a commSyncConfig message containing txParameters in a commSyncConfigList message sequence in a System Information Block (SIB) 18 system message from the eNB.

In Embodiment 1, specific features of the time-frequency resources for transmitting the synchronization signal comprise:

Time-domain feature: the position of a subframe for transmitting the SLSS synchronization signal by the VUE satisfies the following condition: (10*SFN+sn) mod 40=syncOffsetIndicator, where SFN is a system frame number corresponding to this subframe, and sn is a subframe number of this subframe. The VUE determines a value of the syncOffsetIndicator by receiving a commSyncConfig message containing txParameters in a commSyncConfigList message sequence in an SIB 18 system message from the eNB.

Frequency-domain feature: the position of a frequency domain for transmitting the SLSS is located on n PRBs in the center of the current carrier, where n is a value defined by the standard, for example, n=6.

In Embodiment 1, the root sequence index of the PSSS is 26, and the VUE determines an index value of the SSSS and a value of a reserved bit in the PSBCH by receiving a commSyncConfig message containing txParameters in a commSyncConfigList message sequence in an SIB18 system message from the eNB.

In Embodiment 1, the VUE may use the eNB as a reference synchronization source or a GNSS as a reference synchronization source according to an indication from the eNB, and the VUE sets specified bits among reserved bits in the PSBCH as corresponding values to distinguish the two different states. For example, if the VUE uses the eNB as a reference synchronization source, an even (or odd) number bits among first N bits of reserved bits in the PSBCH are set as a first specified value, for example, 1 (or 0); and, if the VUE uses a GNSS as a reference synchronization source, an even (or odd) number bits among first N bits of reserved bits in the PSBCH are set as a second specified value. For example, the second specified value is inverted to the first specified value. For example, the second specified value is set as 0 (or 1) The value of the N is specified by the standard.

Meanwhile, the VUE should set an inCoverage field in the PSBCH in the synchronization signal as TRUE to indicate that the VUE is in coverage.

Now, Embodiment 1 ends. With the method provided by Embodiment 1, the VUE can reuse time-frequency resources already configured for transmission of a synchronization signal by a D2D terminal in a cell, so that it is advantageous to reduce the influence of the V2X communication on the cellular network communication in the cell. In addition, since the SLSS transmitted by the VUE is identical to the SLSS transmitted by the D2D terminal, the SLSS transmitted by the VUE can support the synchronization of the D2D terminal; and vice versa.

EMBODIMENT 2

In Embodiment 2, the UE is an autonomous VUE which acquires corresponding information for transmission of an SLSS according to the pre-configuration. The VUE can use another UE or GNSS transmitting the SLSS as a reference synchronization source, and then transmit the SLSS and the PSBCH by taking the UE, or GNSS as reference. In order to reduce the influence on the cellular network communication and ensure the backward compatibility, the VUE reuses time-frequency resources configured for transmission of an SLSS by a D2D terminal in a cell, and uses the same synchronization sequence and PSBCH structure as the D2D terminal. Specific implementation steps are as follows.

Step 410: By a VUE, specific transmission conditions for an SLSS/PSBCH, the position of a time-frequency resource for transmitting the SLSS/PSBCH, an SLSS sequence index and a value of a partial field of the PSBCH are determined.

Step 420: By the VUE, corresponding SLSS and PSBCH are transmitted on corresponding time-frequency resources when the transmission conditions for the SLSS are satisfied.

In Embodiment 2, the time to transmit a synchronization signal is as follows:

if a reference synchronization source of the VUE is a LE transmitting the SLSS, the VUE starts to transmit the SLSS and the PSBCH when a value of an RSRP received from the current reference synchronization source is lower than a value corresponding to syncTxThreshOoC in pre-configuration information, wherein the RSRP is measured according to a Demodulation Reference Signal (DMRS) of the PSBCH of the reference synchronization source; and if a reference synchronization source of the VUE is a GNSS, the VUE starts to transmit the SLSS when a geographical location of the VUE is within a trigger region, wherein the trigger region is determined by the VUE according to the pre-configuration.

In Embodiment 2, specific features of the time-frequency resources for transmitting the synchronization signal comprise:

Time-domain feature: the position of a subframe for transmitting the SLSS synchronization signal by the VUE satisfies the following condition: (10*DFN+sn) mod 40=syncOffsetIndicator1 or (10*DFN+sn) mod 40=syncOffsedndicator2, where DFN is a system frame number corresponding to the subframe, and sn is a subframe number of this subframe. The VUE determines a value of the syncOffsetIndicator1 or syncOffsetIndicator2 via the pre-configuration. If the current reference synchronization source of the VUE is an external UE, i.e., another UE (which may be a VUE or a D2D terminal), and an offset of the position of a subframe for transmitting the SLSS by this UE is syncOffsetIndicator1, the offset of the subframe for transmitting the SLSS by the VUE should be syncOffsetIndicator2. Conversely, if the offset of the position of the subframe for transmitting the SLSS by this UE is syncOffsetIndicator2, the offset of the subframe for transmitting the SLSS by the VUE is syncOffsetIndicator1. If the current synchronization source of the VUE is a GNSS, the VUE can select any one of the syncOffsetIndicator1 and syncOffsetIndicator2 as the offset of the subframe for transmitting the SLSS.

Frequency-domain feature: The position of a frequency domain for transmitting the SLSS is located on n PRBs in the center of the current carrier, where n is a value defined by the standard, for example, n=6.

In Embodiment 2, if the reference synchronization source of the VUE is a GNSS, a root sequence index of a PSSS is 26, and an index value of an SSSS is randomly selected from the range of 0 to 167. If the reference synchronization source of the VUE is a UE transmitting the SLSS and this UE uses an eNB as a reference synchronization source, the root sequence index of the PSSS is 26, and the index value of the SSSS is identical to an index value of an SSSS transmitted by the reference synchronization source. If the reference synchronization source of the VUE is a UE transmitting the SLSS and this UE uses a GNSS as a reference synchronization source, the root sequence index value of the PSSS is 37, and the index value of the SSSS is $ID\_r+168$, where $ID\_r$ is the index of the SSSS transmitted by the reference synchronization source. If the reference synchronization source of the VUE is another synchronization source, in accordance with one method in this embodiment, this VUE does not execute step 402, and both the root sequence index of the PSSS and the index of the SLSS are null; and, in accordance with another method in this embodiment, the root sequence index value of the PSSS is 37 and the index value of the SSSS is $ID\_r+168$, where $ID\_r$ is the index of the SSSS transmitted by the reference synchronization source.

In Embodiment 2, the reference synchronization source of the VUE may be a GNSS; or, the reference synchronization source of the VUE is a LTE transmitting the SLSS, and this UE uses a GNSS as a reference synchronization source; or, the reference synchronization source of the VUE may be a LE transmitting the SLSS, and this UE uses an eNB as a reference synchronization source. Therefore, the VUE needs to set specific bits of the reserved bits in the PSBCH as a corresponding value, for the purpose of identification. For example, if the VUE uses a GNSS as a reference synchronization source, an even (or odd) number bits among first N bits of reserved bits in the PSBCH are set as a first specified value, for example, 1 (or 0), and a specified bit other than the first N bits of the reserved bits in the PSBCH is set as TRUE to indicate that this VUE directly uses the GNSS as a synchronization source, where the position of the specified bit is defined by the standard; if the VUE uses a VUE referring to a GNSS, as a reference synchronization source, an even (or odd) number bits among first N bits of reserved bits in the PSBCH are set as the first specified value, for example, 1 (or 0), and a specified bit other than the first N bits of the reserved bits in the PSBCH is set as FALSE to indicate that this VUE indirectly uses the GNSS as a synchronization source, where the position of the specified bit is defined by the standard; and, if the VUE uses a UE referring to an eNB, as the reference synchronization source, an even or odd number bits among first N bits of reserved bits in the PSBCH are set as a second specified value, where the second specified value can be inverted to the first specified value, for example, 0 (or 1). The value of the N is specified by the standard.

The VUE should set an inCoverage field in the PSBCH in the synchronization signal as FALSE to indicate that the VUE is out of coverage.

Now, Embodiment 2 ends. In this embodiment, the autonomous VUE can reuse time-frequency resources pre-configured for transmission of a synchronization signal by a D2D terminal. Thus, for a terminal supporting both the D2D communication and the V2X communication, the number of transmissions of a synchronization signal can be reduced. In addition, similar to Embodiment 1, since the SLSS transmitted by the VUE is identical to the SLSS transmitted by the D2D terminal, the SLSS transmitted by the VUE can support the synchronization of the D2D terminal; and vice versa.

EMBODIMENT 3

In Embodiment 3, the LE is a controlled VUE which acquires corresponding information for transmission of an SLSS according to an indication from an eNB. The VUE uses an eNB or a GNSS as a reference synchronization source, and transmits an SLSS by taking the eNB or GNSS as reference. In this embodiment, a PSBCH structure transmitted by the VIE may be different from that transmitted by a D2D terminal. In order to avoid mutual influence, the time-frequency resources for transmitting an SLSS by the VUE and an SLSS sequence are both different from those for the D2D terminal. Specific implementation steps are as follows.

Step 510: By a VUE, specific transmission conditions for an SLSS/PSBCH, the position of a time-frequency resource for transmitting the SLSS/PSBCH, an SLSS sequence index and corresponding values of some partial fields of the PSBCH are determined by receiving a signaling from an eNB.

Step 520: By the VUE, corresponding SLSS and PSBCH are transmitted on corresponding time-frequency resources when the transmission conditions for the SLSS are satisfied.

In Embodiment 3, the time to transmit the synchronization signal is as follows.

In accordance with an implementation (method 1) of this embodiment, the VUE starts to transmit the SLSS and the PSBCH when the location of the VUE is within a trigger region, wherein the VUE determines the trigger region by receiving a configuration signaling from an eNB or by the pre-configuration. The method for configuring the trigger region is not limited in the present application.

In accordance with another implementation (method 2) of this embodiment, the VUE starts to transmit the SLSS and the PSBCH when a value of an RSRP received by the VIDE relative to the eNB is lower than syncTxThreshIC, or when an SLSS transmission indication from the eNB is received by the VUE. Wherein, the VUE determines the value of the syncTxThreshIC by receiving a commSyncConfig message containing txParameters in a commSyncConfigList message sequence in an SIB 18 system message from the eNB, or a redefined system message.

In accordance with still another implementation of the present application, if the VUE uses a GNSS as a reference synchronization source, the SLSS transmission is triggered in accordance with the method 1; and, if the VUE uses an eNB as a reference synchronization source, the SLSS transmission is triggered in accordance with the method 2.

In Embodiment 3, position features of the time-frequency resources for transmitting the SLSS/PSBCH comprise:

Time-domain feature: The position of a subframe for transmitting the SLSS synchronization signal by the VUE satisfies the following condition: (10*SFN+sn) mod 40=syncOffsetIndicator-v, where SFN is a system frame number corresponding to this subframe, and sn is a subframe number of this subframe. The VUE determines a value of the syncOffsetIndicator-v by receiving a system message from the eNB. Preferably, the syncOffsetIndicator-v is not equal to the syncOffsetIndicator1 and syncOffsetIndicator2 in Embodiment 2.

Frequency-domain feature: The position of a frequency domain for transmitting the SLSS is located on n PRBs in the center of the current carrier, where n is a specified value defined by the standard, for example, n=6.

In Embodiment 3, the root sequence index of a PSSS is defined by the standard, and is not equal to a root sequence (i.e., 25, 29 and 34) already used for the Primary Synchronization Signal PSS and also not equal to a root sequence (i.e., 26 and 37) already used for the PSSS transmitted by the D2D terminal. The WYE determines an index value of an SSSS by receiving a system message from the eNB, and the index value of the SSSS is not equal to a sequence index (i.e., 0 to 335) already used for the SSSS transmitted by the D2D terminal. The VUE determines a value of a reserved bit in the PSBCH by receiving a signaling from the eNB.

In Embodiment 3, the VUE may use the eNB as a reference synchronization source or a GNSS as a reference synchronization source according to an indication from the eNB, and the VUE sets specified bits of reserved bits in the PSBCH as corresponding values to distinguish the two different states. For example, if the VUE uses the eNB as a reference synchronization source, an even (or odd) number bits among first N bits of reserved bits in the PSBCH are set as a first specified value, for example, 1 (or 0); and, if the VUE uses a GNSS as a reference synchronization source, an even (or odd) number bits among first N bits of reserved bits in the PSBCH are set as a second specified value, where the second specified value can be inverted to the first specified value, for example, 0 (or 1), and the value of the N is defined by the standard.

The VUE should set an inCoverage field in the PSBCH in the synchronization signal as TRUE to indicate that the V2X terminal is in coverage.

Now, Embodiment 3 ends. With the method provided by Embodiment 3, since the time-frequency resources for transmitting an SLSS/PSBCH by the VUE are different from the time-frequency resources configured for transmitting an SLSS/PSBCH by a D2D terminal, the mutual interference between the both due to different PSBCH structures can be avoided. In addition, since the SLSS sequence used by the VUE, is different from that used by the D2D terminal, the influence on the synchronization of a backward D2D terminal can be avoided.

EMBODIMENT 4

In Embodiment 4, the UE is an autonomous VUE which acquires corresponding information for transmission of an SLSS according to the pre-configuration. The VUE can use another UE or GNSS transmitting the SLSS as a reference synchronization source, and then transmit the SLSS and the PSBCH by taking the UE or GNSS as reference. In this embodiment, a PSBCH structure transmitted by the VUE may be different from that transmitted by a D2D terminal. In order to avoid mutual influence, the time-frequency resources for transmitting an SLSS by the VUE and an SLSS sequence are both different from those for the D2D terminal. Specific implementation steps are as follows.

Step 610: By a VUE, specific transmission conditions for an SLSS/PSBCH, the position of a time-frequency resource for transmitting the SLSS/PSBCH, an SLSS sequence index and corresponding values of some partial fields of the PSBCH are determined.

Step 620: By the VUE, corresponding SLSS and PSBCH are transmitted on corresponding time-frequency resources when the transmission conditions for the SLSS are satisfied.

In Embodiment 4, the time to transmit a synchronization signal is as follows: the WYE starts to transmit the synchronization signal when a geographical location of the VUE is within a trigger region, wherein the VUE determines the range of the trigger region by pre-configuration information. Or the VUE does not detect any synchronization source.

In Embodiment 4, specific features of the time-frequency resource comprise:

Time-domain feature: The position of a subframe for transmitting the SLSS synchronization signal by the VUE satisfies the following condition: (10*DFN+sn) mod 40=syncOffsetIndicator-v1 or (10*DFN+sn) mod 40=syncOffsetIndicator-v2, where DFN is a system frame number corresponding to this subframe, and sn is a subframe number of this subframe. The VUE determines a value of the syncOffsetIndicator-v1 or syncOffsetIndicator-v2 via pre-configuration information. Preferably, the syncOffsetIndicator-v1 and the syncOffsetIndicator-v2 are not equal to the syncOffsetIndicator1 and the syncOffsetIndicator2 in Embodiment 2. If the current reference synchronization source of the VUE is an external UE, for example, another UE (which may be a VUE or a D2D terminal), and the offset of the position of a subframe for transmitting the SLSS by this UE is syncOffsetIndicator-v1, the offset of the subframe for transmitting the SLSS by the VUE should be syncOffsetIndicator-v2. Conversely, if the offset of the position of the subframe for transmitting the SLSS by this UE is svncOffsetIndicator-v2, the offset of the subframe for transmitting the SLSS by the VUE is syncOffsetIndicator-v1. If the current synchronization source of the VUE is a GNSS, the NUE can select any one of the syncOffsetIndicator-v1 and syncOffsetIndicator-v2 as the offset of the subframe for transmitting the SLSS.

Frequency-domain feature: The position of a frequency domain for transmitting the SLSS is located on n PRBs in the center of the current carrier, where n is a value specified by the standard, for example, n=6.

In Embodiment 4, if the reference synchronization source of the VUE is another VUE transmitting an SLSS within an in-coverage range, and this VUE transmitting the SLSS uses an eNB as a reference synchronization source, the index value of an SSSS is identical to an index value of an SSSS transmitted by the reference synchronization source. If the reference synchronization source of the VUE is another VUE transmitting an SLSS, and this VUE uses a GNSS as a reference synchronization source, the index value of the SSSS is a specified value defined by the standard (e.g., 503). In this case, the SSSS index value is merely used for this type of VUEs. Or the index value of the SSSS is identical to the index value of the SSSS transmitted by the VUE serving as the reference synchronization source. If the reference synchronization source of the VUE is a GNSS, the index for transmitting the SSSS is randomly selected from a range from 336 to 503 or a subset of the range (e.g., from 336 to 419 or from 336 to 502) by the VUE, or is a specified value defined by the standard (e.g., 502). In this case, the SSSS index value is merely used for this type of VUEs. If the VUE does not detect any synchronization source, the index value of the SSSS transmitted by the VUE is a specified value defined by the standard (e.g., 501). In this case, the SSSS index value is merely used for this type of VUEs. In the above cases, the root sequence index of a PSSS transmitted by the VUE is defined by the standard, and is not equal to a root sequence (i.e., 25, 29 and 34) already used for the PSSS and also not equal to a root sequence (i.e., 26 and 37) already used for the PSSS transmitted by the D2D terminal. If the reference synchronization source is a synchronization source of other types, the VUE does not need to execute step 620, and both the PSSS root sequence index and the SLSS index are null.

In Embodiment 4, the reference synchronization source of the VUE may be a GNSS; or, the reference synchronization source of the VUE is a VUE transmitting the SLSS, and this VUE uses a GNSS as a reference synchronization source; or, the reference synchronization source of the VUE may be a VUE transmitting the SLSS, and this VUE uses an eNB as a reference synchronization source. Therefore, the VUE needs to set specified bits of the reserved bits in the PSBCH as a corresponding value, for the purpose of identification. For example, if the VUE uses a GNSS as a reference synchronization source, an even (or odd) number bits among first N bits of reserved bits in the PSBCH are set as a first specified value, for example, 1 (or 0), and a specified bit other than the first N bits of the reserved bits in the PSBCH is set as TRUE to indicate that this VUE directly uses the GNSS as a synchronization source, where the position of the specified bit is defined by the standard; if the VUE uses a VUE referring to a GNSS, as a reference synchronization source, an even (or odd) number bits among first N bits of reserved bits in the PSBCH are set as the first specified value, for example, 1 (or 0), and a specified bit other than the first N bits of the reserved bits in the PSBCH is set as FALSE to indicate that this VUE indirectly uses the GNSS as a synchronization source, where the position of the bit is defined by the standard; and, if the VUE uses a VUE referring to an eNB, as a reference synchronization source, an even or odd number bits among first N bits of reserved bits in the PSBCH are set as a second specified value. For example, the second specified value can be inverted to the first specified value, for example, 0 (or 1). The value of the N is defined by the standard.

The VUE should set an inCoverage field in the PSBCH as FALSE to indicate that the V2X terminal is out of coverage.

Now, Embodiment 4 ends. In Embodiment 4, since the autonomous VUE transmits an SLSS and a PSBCH on different time-frequency resources by using a synchronization sequence different from that for the D2D terminal, the interference to the SLSS and PSBCH transmitted by the D2D terminal can be avoided.

EMBODIMENT 5

In Embodiment 5, a VUE is a terminal receiving a synchronization signal. The Embodiment 5 provides a receipt processing method for time-frequency synchronization between VUEs. Specific steps for determining a reference synchronization source are as follows.

Step 710: By a VUE, a synchronization signal is detected, and synchronization source types are determined according to the detected synchronization signal.

If the VUE detects an SLSS and a PSBCH, the VUE can determine a synchronization source type according to a PSSS root sequence index of the SLSS, an SSSS index of the SLSS, a value of a reserved bit field in the PSBCH and a value of inCoverage in the PSBCH. A specific determination method comprises at least one of the following steps.

If the value of an inCoverage field in the PSBCH in the synchronization signal is TRUE, and a corresponding bit in reserved bits of the PSBCH indicates that a transmitting VUE transmitting the synchronization signal uses an eNB as a reference synchronization source, it is decided that a synchronization source corresponding to the synchronization signal is a UE that directly uses an eNB as a reference synchronization source and is in coverage. For example, corresponding to the embodiments described above, for the corresponding bit, when an even or odd number bits among first N bits of reserved bits are set as a first specified value, it is decided that a synchronization source corresponding to the synchronization signal is a UE that directly uses an eNB as a reference synchronization source and is in coverage.

If the value of the inCoverage field in the PSBCH in the synchronization signal is TRUE, and a corresponding bit in the reserved bits of the PSBCH indicates that a transmitting VUE transmitting the synchronization signal uses a GNSS as a reference synchronization source, it is decided that a synchronization source corresponding to the synchronization signal is a UE that directly uses a GNSS as a reference synchronization source and is in coverage. For example, corresponding to the embodiments described above, for the corresponding bit, when an even or odd number bits among first N bits of reserved bits are set as a second specified value, it is decided that a synchronization source corresponding to the synchronization signal is a UE that directly uses a GNSS as a reference synchronization source and is in coverage.

If the value of the inCoverage field in the PSBCH in the synchronization signal is FALSE, and a corresponding bit in the reserved bits of the PSBCH indicates that a transmitting VUE transmitting the synchronization signal uses a GNSS as a reference synchronization source, according to the index value of an SSSS of the synchronization signal, it can be further decided that a synchronization source corresponding to the synchronization signal is a UE that directly uses a GNSS as a reference synchronization source and is out of coverage, or a UE that indirectly uses a GNSS as a reference synchronization source and is out of coverage, or an independent UE.

If the value of the inCoverage field in the PSBCH in the synchronization signal is FALSE, and a corresponding bit in the reserved bits of the PSBCH indicates that a transmitting VUE transmitting the synchronization signal uses an eNB as a reference synchronization source, it is decided that a synchronization source corresponding to the synchronization signal is a UE that indirectly uses an eNB as a reference synchronization source and is out of coverage. For example, corresponding to the embodiments described above, for the corresponding bit, when an even or odd number bits among first N bits of the reserved bits are set as a second specified value, it is decided that a synchronization source corresponding to the synchronization signal is a UE that indirectly uses an eNB as a reference synchronization source and is out of coverage.

Step 720: A synchronization source type having a highest priority is selected from the synchronization source types determined in the above step to serve as a reference synchronization source according to a specified synchronization source priority.

There are three exceptions. (1) If the VUE can detect an eNB on a carrier performing V2X communication, according to the eNB, it is indicated that the eNB or GNSS is preferentially used as a reference synchronization source. Preferably, if the eNB on the V2X communication carriers configures the current carrier to preferentially use an eNB as a reference synchronization source, the configuration signaling should further contain a physical cell ID and/or an operating frequency or other information corresponding to the eNB serving as the reference synchronization source. The VUE determines the eNB serving as the reference synchronization source according to the physical cell ID and/or operating frequency in the configuration signaling. (2) If the VUE can detect a configuration signaling from an eNB on a carrier other than the V2X communication carrier, and the configuration signaling contains synchronization source priority configuration information on the current V2X communication carrier, the VUE preferentially selects the eNB or GNSS as a reference synchronization source according to the configuration from the eNB. In this case, the eNB serving as the synchronization source can be an eNB on the V2X communication carrier, an eNB transmitting the configuration signaling, or an eNB on other carriers. Preferably, if the eNB configures a certain V2X communication carrier to preferentially use the eNB as a reference synchronization source, the configuration signaling should further contain a physical cell ID and/or an operating frequency or other information corresponding to the eNB serving as the reference synchronization source. (3) if the VUE does not detect any eNB on all carriers, but can detect a reliable GNSS synchronization signal, a GNSS is used as a reference synchronization source.

If the VUE does not detect any eNB on all supported carriers and also does not receive any reliable GNSS synchronization signal, but detects synchronization signals transmitted by other UEs, the VUE selects a detected synchronization source having a highest priority as the reference synchronization source according to the following priorities a1 to a5 or priorities A1 to A5. Synchronization sources are successively as follows according to priorities a1 to a5 from high to low:

a1: a UE that directly uses an eNB as a reference synchronization source and is in coverage, or a UE that directly uses a GNSS as a reference synchronization source and is in coverage;

a2: a UE that directly uses a GNSS as a reference synchronization source and is out of coverage;

a3: a UE that indirectly uses a GNSS as a reference synchronization source and is out of coverage;

a4: a UE that indirectly uses an eNB as a reference synchronization source; and a5: an independent UE;

or, synchronization sources are successively as follows according to priorities A1 to A5 from high to low:

A1: a UE that directly uses a GNSS as a reference synchronization source;

A2: a UE that indirectly uses a GNSS as a reference synchronization source and is out of coverage;

A3: a UE that directly uses an eNB as a reference synchronization source;

A4: a UE that indirectly uses an eNB as a reference synchronization source; and

A5: an independent UE.

If the VUE can detect an eNB on a certain carrier, and this eNB configures the current V2X communication carrier to preferentially use an eNB as a reference synchronization source and also configures a physical cell ID and/or an operating carrier frequency of the eNB serving as the reference synchronization source, but if the VUE does not detect the configured eNB serving as the reference synchronization source, the following implementations 1, 2 or 3 can be employed.

Implementation 1: To ensure the timing of preferentially synchronizing the VUE to an eNB, the VUE selects a detected synchronization source having a highest priority as a reference synchronization source according to the following priorities b1 to b6. Synchronization sources are successively as follows according to priorities b1 to b6 from high to low:

b1: a UE that directly uses an eNB as a reference synchronization source;

b2: a UE that indirectly uses an eNB as a reference synchronization source;

b3: a GNSS;

b4: a UE that directly uses a GNSS as a reference synchronization source;

b5: a UE that indirectly uses a GNSS as a reference synchronization source and is out of coverage; and b6: an independent UE.

Implementation 2: To preferentially synchronize the VUE to a GNSS and consider the protection to the cellular communication, the VUE selects a detected synchronization source having a highest priority as a reference synchronization source according to the following priorities c1 to c6.

Synchronization sources are successively as follows according to priorities c1 to c6 from high to low:

c1: a GNSS;

c2: a LT that directly uses an eNB as a reference synchronization source and is in coverage, or a UE that directly uses a GNSS as a reference synchronization source and is in coverage;

c3: a UE that directly uses a GNSS as a reference synchronization source and is out of coverage;

c4: a UE that indirectly uses a GNSS as a reference synchronization source and is out of coverage;

c5: a UE that indirectly uses an eNB as a reference synchronization source; and c6: an independent UE.

Implementation 3: To preferentially synchronize the VUE to a GNSS, the VUE selects a detected synchronization source having a highest priority as a reference synchronization source according to the following priorities d1 to d6. Synchronization sources are successively as follows according to priorities d1 to d6 from high to low:

d1: a GNSS;

d2: a UE that directly uses a GNSS as a reference synchronization source;

d3: a UE that indirectly uses a GNSS as a reference synchronization source and is out of coverage;

d4: a UE that directly uses an eNB as a reference synchronization source;

d5: a UE that indirectly uses an eNB as a reference synchronization source; and d6: an independent UE.

If the VUE can detect an eNB on a certain carrier, and this eNB configures the current V2X communication carrier to preferentially use a GNSS as a reference synchronization source, but if the VUE does not detect any reliable GNSS signal, the following implementations A, B or C can be employed.

Implementation A: To ensure the timing of preferentially synchronizing the VUE to a GNSS, the VUE selects a detected synchronization source having a highest priority as a reference synchronization source according to the following priorities e1 to e6. Synchronization sources are successively as follows according to priorities e1 to e6 from high to low:

e1: a UE that directly uses a GNSS as a reference synchronization source;

e2: a UE that indirectly uses a GNSS as a reference synchronization source and is out of coverage;

e3: an eNB;

e4: a UE that directly uses an eNB as a reference synchronization source;

e5: a UE that indirectly uses an eNB as a reference synchronization source; and e6: an independent UE.

Implementation B: To preferentially synchronize the VUE to an eNB, the VUE selects a detected synchronization source having a highest priority as a reference synchronization source according to the following priorities f1 to f6. Synchronization sources are successively as follows according to priorities f1 to f6 from high to low:

f1: an eNB;

f2: a UE that directly uses an eNB as a reference synchronization source and is in coverage, or a UE that directly uses a GNSS as a reference synchronization source and is in coverage;

f3: a UE that indirectly uses an eNB as a reference synchronization source;

f4: a UE that directly uses a GNSS as a reference synchronization source and is out of coverage;

f5: a UE that indirectly uses a GNSS as a reference synchronization source and is out of coverage; and f6: an independent UE.

Implementation C: To preferentially synchronize the VUE to a GNSS and consider the protection to the cellular communication, the VUE selects a detected synchronization source having a highest priority as a reference synchronization source according to the following priorities g1 to g5. Synchronization sources are successively as follows according to priorities g1 to g5 from high to low:

g1: a UE that directly uses an eNB as a reference synchronization source and is in coverage, or a UE that directly uses a GNSS as a reference synchronization source and is in coverage;

g2: a UE that directly uses a GNSS as a reference synchronization source and is out of coverage;

g3: a UE that indirectly uses a GNSS as a reference synchronization source and is out of coverage;

g4: a UE that indirectly uses an eNB as a reference synchronization source; and g5: an independent UE.

Now, Embodiment 5 ends. With the method provided by Embodiment 5, the VUE can select a synchronization source having a highest accuracy as a reference synchronization source, so it is advantageous for improvement of the V2X communication performance.

EMBODIMENT 6

In Embodiment 6, the UE can be a controlled VUE or an autonomous VUE. If the UE is a controlled VUE, the VUE acquires corresponding information for transmitting an SLSS according to the an indication from an eNB, uses an eNB or a GNSS as a reference synchronization source, and transmits the SLSS by taking the eNB or GNSS as reference. If the UE is an autonomous VUE, the VUE acquires corresponding information for transmitting an SLSS according to the pre-configuration, and the VUE can use another UE or GNSS transmitting an SLSS as a reference synchronization source and then transmit the SLSS and the PSBCH by taking the UE or GNSS as reference. Specific implementation steps are as follows.

Step 810: By a VUE, specific transmission conditions for an SLSS/PSBCH, the position of a time-frequency resource for transmitting the SLSS/PSBCH, an SLSS sequence index and corresponding values of some partial fields of the PSBCH are determined.

For a controlled VUE, the information is acquired by receiving a signaling from an eNB. However, for an autonomous VUE, the corresponding information for transmitting the SLSS is acquired according to the pre-configuration.

Step 820: By the VUE, corresponding SLSS and PSBCH are transmitted on corresponding time-frequency resources when the transmission conditions for the SLSS are satisfied.

In Embodiment 5, the time to transmit the synchronization signal is as follows.

In accordance with an implementation (method 1) of this embodiment, the VUE starts to transmit the SLSS and the PSBCH when the location of the VUE is within a trigger region, wherein the VUE determines the trigger region by receiving a configuration signaling from an eNB or by the pre-configuration. The method for configuring the trigger region is not limited in the present application.

In accordance with another implementation (method 2) of this embodiment, the VUE starts to transmit the SLSS and the PSBCH when a value of an RSRP received by the VUE relative to the eNB is lower than syncTxThreshIC, or when an SLSS transmission indication from the eNB is received by the VUE. Wherein, the VUE determines the value of the syncTxThreshIC by receiving a commSyncConfig message containing txParameters in a commSyncConfigList message sequence in an SIB18 system message from the eNB, or a redefined system message.

In accordance with still another implementation of the present application, if the VUE uses a GNSS as a reference synchronization source, the SLSS transmission is triggered in accordance with the method 1; and, if the VUE uses an eNB as a reference synchronization source, the SLSS transmission is triggered in accordance with the method 2.

In Embodiment 5, position features of the time-frequency resources for transmitting the SLSS/PSBCH comprise:

Time-Domain Feature:

If the VUE uses an eNB as a reference synchronization source (the VUE is a controlled VUE in this case), the position of a subframe for transmitting the SLSS synchronization signal by the NI UE satisfies the following condition: (10*SFN+sn) mod 160=syncOffsetIndicator-v, where SEN is a system frame number corresponding to this subframe, and sn is a subframe number of this subframe. The VUE determines a value of the syncOffsetIndicator-v by receiving a system message from the eNB. Preferably, the mod(syncOffsetIndicator-v,40) is not equal to the syncOffsetIndicator1 and syncOffsetIndicator2 in Embodiment 2.

For a controlled VUE using a GNSS as a synchronization source, the position of a subframe for transmitting the SLSS synchronization signal by the VUE satisfies the following condition: (10*G-SFN+sn) mod 160=syncOffsetIndicator-v1. The VUE determines the value of syncOffsetIndicator-v1 by the pre-configuration or by receiving a signaling from an eNB. Preferably, 0≤syncOffsetIndicator-v1<160. Wherein, G-SFN is the current system frame number determined by the UE according to the GNSS timing. In this case, the SSSS index value used by the VUE should be 0, and the inCoverage field should be set as TRUE.

For an autonomous VUE using a GNSS as a synchronization source (autonomous VUE1), if this VUE is unable to read a PSBCH transmitted by a controlled VUE using the GNSS as a synchronization source, the position of a subframe for transmitting the SLSS synchronization signal by this VUE satisfies the following condition: (10*G-SFN+sn) mod 160=syncOffsetIndicator-v3. The NI UE determines the value of syncOffsetIndicator-v3 by the pre-configuration. Preferably, 0≤syncOffsetIindicator-v3<160, and the syncOffsetIndicator-v3 is not equal to syncOffsetIndicator-v1. Wherein, G-SFN is the current system frame number determined by the UE according to the GNSS timing. In this case, the SSSS index value used by the VUE should be 0, and the inCoverage field should be set as FALSE. If the VUE can read a PSBCH transmitted by a controlled VUE using the GNSS as a synchronization source, the position of a subframe for transmitting the SLSS synchronization signal by this VUE satisfies the following condition: (10*G-SFN+sn) mod 160=syncOffsetIndicator-v1. The VUE determines the value of syncOffsetIndicator-v1 by the pre-configuration. In this case, the SSSS index value used by the VUE should be 0, and the inCoverage field should be set as TRUE.

For an autonomous VUE using a controlled VUE synchronized to GNSS as a synchronization source (i.e., a controlled UE having an SSSS index value of 0 and an inCoverage field set as TRUE) (autonomous VUE2), the position of a subframe for transmitting the SLSS synchronization signal by the VUE satisfies the following condition: (10*G-SFN+sn) mod 160=syncOffsetIndicator-v2. The VUE determines the value of syncOffsetIndicator-v2 by the pre-configuration. Preferably, 0≤syncOffsetIndicator-v2≤160, and the syncOffsetIndicator-v2 is not equal to the syncOffsetIndicator-v1 and syncOffsetIndicator-v1. Wherein, G-SFN is the current system frame number determined by the UE according to the GNSS timing. In this case, the SSSS index value used by the VUE should be 0, and the inCoverage field should be set as FALSE.

For an autonomous VUE using an autonomous VUE1 as a synchronization source, the position of a subframe for transmitting the SLSS synchronization signal by the VUE satisfies the following condition: (10*G-SFN+sn) mod 160=syncOffsetIndicator-v2. The VUE determines the value of syncOffsetIndicator-v2 by the pre-configuration. Preferably, 0≤syncOffsetIndicator-v2<160, and the syncOffsetIndicator-v2 is not equal to the syncOffsetIndicator-v1 and syncOffsetIndicator-v1. Wherein, G-SFN is the current system frame number determined by the UE according to the GNSS timing. In this case, the SSSS index value used by the VUE should be 168, and the inCoverage field should be set as FALSE.

For an autonomous VUE using an autonomous VUE2 as a synchronization source, the position of a subframe for transmitting the SLSS synchronization signal by the VUE satisfies the following condition: (10*G-SFN+sn) mod 160=syncOffsetIndicator-v1. The VUE determines the value of syncOffsetIndicator-v1 by the pre-configuration. Wherein, G-SFN is the current system frame number determined by the UE according to the GNSS timing. In this case, the SSSS index value used by the VUE should be 168, and the inCoverage field should be set as FALSE.

Frequency-Domain Feature:

The position of a frequency domain for transmitting the SLSS is located on n PRBs in the center of the current carrier, where n is a specified value defined by the standard, for example, n=6.

Now, Embodiment 6 ends. With the method provided by Embodiment 5, the direct mutual interference between a controlled VUE using a GNSS as a synchronization source and an autonomous VUE using a GNSS as a synchronization source can be avoided, and the interference between a VUE using a VUE1 as a synchronization source and a VUE using an autonomous VUE2 as a synchronization source can be avoided.

Figure 3:
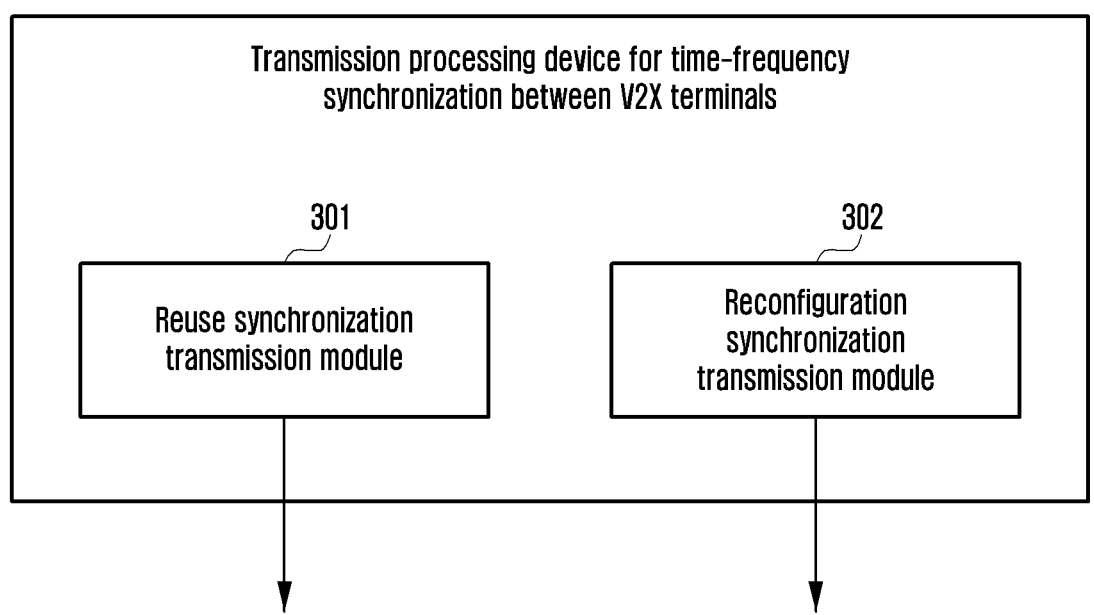
FIG. 3 is a schematic composition diagram of a transmission processing device for time-frequency synchronization between V2X terminals.

Corresponding to the methods described above, the present invention further discloses a transmission processing device for time-frequency synchronization between V2X terminals, FIG. 3 is a schematic composition diagram of the transmission processing device for time-frequency synchronization between V2X terminals. The transmission processing device comprises:

a reuse synchronization transmission module 301, configured to, when a synchronization signal to be transmitted by a V2X terminal is identical to a synchronization signal of an existing D2D terminal, reuse time-frequency resources configured for transmission of the synchronization signal by the D2D terminal in a cell to transmit the synchronization signal; and a reconfiguration synchronization transmission module 302, configured to, when a synchronization signal to be transmitted by the V2X terminal is different from a synchronization signal of an existing D2D terminal, use reconfigured time-frequency resources to transmit the synchronization signal. In a preferred embodiment, when the synchronization signal to be transmitted by the V2X terminal is different from the synchronization signal of the existing D2D terminal, an SLSS sequence in the synchronization signal is different from that in the synchronization signal of the existing D2D terminal.

Wherein, in the synchronization signal transmitted by the V2X terminal, a corresponding synchronization source type is indicated by using an SLSS sequence index and/or a value of a PSBCH specified field.

Figure 4:
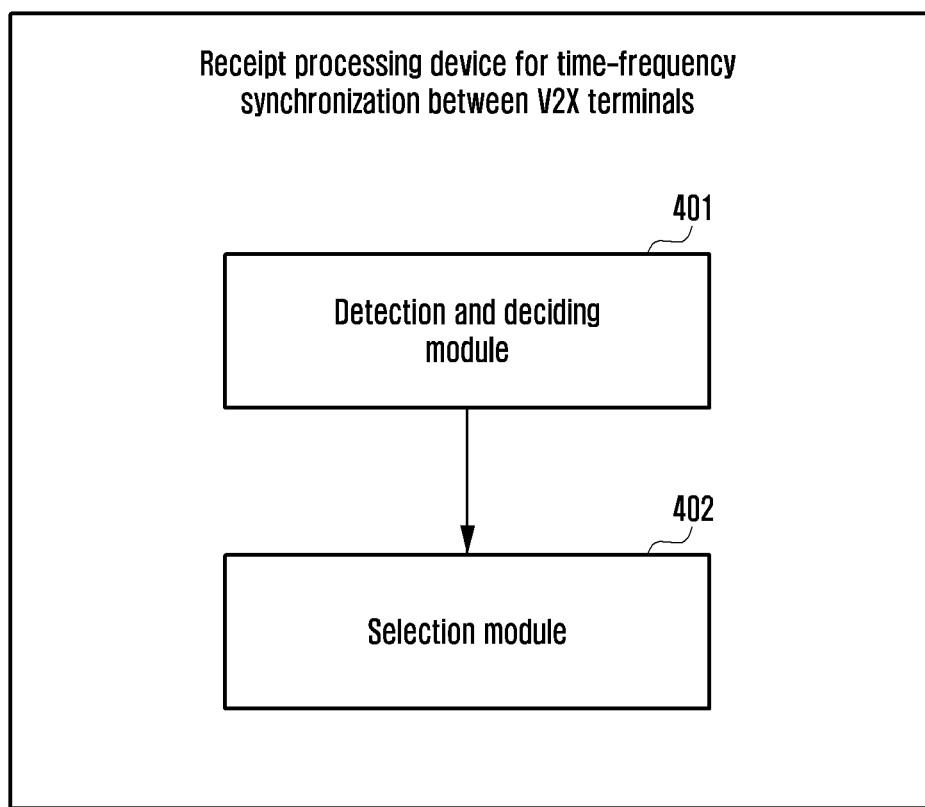
FIG. 4 is a schematic composition diagram of a receipt processing device for time-frequency synchronization between V2X terminals.

Corresponding to the methods described above, the present invention further discloses a receipt processing device for time-frequency synchronization between V2X terminals. FIG. 4 is a schematic composition diagram of the receipt processing device for time-frequency synchronization between V2X terminals. The receipt processing device comprises:

a detection and deciding module 401, configured to detect a synchronization signal, and determine corresponding synchronization source types according to an SLSS sequence index and/or a value of a PSBCH specified field in the detected synchronization signal; and a selection module 402, configured to select, from the synchronization source types determined by the detection and deciding module, a synchronization source type having a highest priority as a reference synchronization source according to a specified synchronization source priority.

It can be understood by a person of ordinary skill in the art that all of or a part of steps in the embodiment methods can be implemented by instructing related hardware by programs. The programs can be stored in a computer-readable storage medium, and, when executed, include one of or a combination of the steps of the method embodiments.

In addition, each functional unit in each embodiment of the present application can be integrated into a processing module; or, each unit can exist alone physically; or, two or more units can be integrated into one module. The integrated module can be implemented in the form of hardware, or can be implemented in the form of a software functional module. If the integrated module is implemented in the form of a software functional module and sold or used as an independent product, the integrated module can also be stored in a computer-readable storage medium.

In addition, each embodiment of the present invention can be implemented by a data processing program executed by a data processing equipment, such as a computer. Apparently, the data processing program constitutes the present invention. In addition, generally, the data processing programs stored in a storage medium are executed by directly reading the programs from the storage medium or by installing or copying the programs onto a storage device (e.g., a hard disk and/or a memory) of the data processing equipment. Therefore, the storage medium also constitutes the present invention. The storage medium can be a record mode of any type, for example, a paper storage medium (e.g., a paper tape, etc.), a magnetic storage medium (e.g., a soft disk, a hard disk, a flash memory, etc.), an optical storage medium (e.g., a CD-ROM, etc.), a magneto-optical storage medium (e.g., a MO, etc.) or more.

Therefore, the present invention further discloses a storage medium in which data processing programs are stored, the data processing programs being used for executing any one embodiment of the methods provided by the present invention.

In addition, except the data processing programs, the steps of the method provided by the present invention can also be implemented by hardware. For example, the steps can be implemented by a logic gate, a switch, an Application-Specific Integrated Circuit (ASIC), a programmable logic controller, an embedded microcontroller or more. Thus, such hardware for implementing the methods provided by the present invention also constitutes the present invention.

The foregoing description shows preferred embodiments of the present invention and is not intended to limit the present invention. Any modification, equivalent replacement or improvement made within the spirit and principle of the present invention shall fall into the protection scope of the present invention.

What is claimed:

1. A method performed by a terminal in a wireless communication system, the method comprising:
   identifying configuration information for sidelink communication including information indicating a synchronization priority;
   identifying whether the information is set to a global navigation satellite system (GNSS) or a base station; and
   in case that the information is set to the GNSS, selecting a synchronization reference from a plurality of the synchronization signals detected by the terminal based on a priority order,
   wherein the priority order identified by:
      at least one first terminal transmitting at least one first synchronization signal has a first priority;
      the base station has a second priority;
      at least one second terminal transmitting at least one second synchronization signal has a third priority; and
      other terminals have a fourth priority, and
   wherein the at least one first terminal has selected the GNSS as the synchronization reference and the at least one second terminal has selected the base station as the synchronization reference.

2. The method of claim 1, wherein a priority for a terminal in coverage of the at least one first terminal is higher than a priority for a terminal out of coverage of the at least one first terminal.

3. The method of claim 1, wherein a priority for a terminal in coverage of the at least one second terminal is higher than a priority for a terminal out of coverage of the at least one second terminal.

4. The method of claim 1, wherein the base station is enabled to be detected by the terminal as the synchronization reference.

5. The method of claim 1, in case that the information is set to the base station, the priority order for selecting the synchronization reference is based on the following:
   the at least one second terminal transmitting the at least one second synchronization signal has the first priority;
   the GNSS has the second priority;
   the at least one first terminal transmitting the at least one first synchronization signal has the third priority; and
   the other terminals have the fourth priority.

6. The method of claim 5, wherein a priority for a terminal in coverage of the at least one first terminal is higher than a priority for a terminal out of coverage of the at least one first terminal.

7. The method of claim 5, wherein a priority for a terminal in coverage of the at least one second terminal is higher than a priority for a terminal out of coverage of the at least one second terminal.

8. A terminal in a wireless communication system, the terminal comprising:
   a transceiver; and
   a controller configured to:

identify configuration information for sidelink communication including information indicating a synchronization priority;

identify whether the information is set to a global navigation satellite system (GNSS) or a base station; and in case that the information is set to the GNSS, select a synchronization reference from a plurality of the synchronization signals detected by the terminal based on a priority order, wherein the priority order identified by:
at least one first terminal transmitting at least one first synchronization signal has a first priority;
the base station has a second priority;
at least one second terminal transmitting at least one second synchronization signal has a third priority; and
other terminals have a fourth priority, and wherein the at least one first terminal has selected the GNSS as the synchronization reference and the at least one second terminal has selected the base station as the synchronization reference.

9. The terminal of claim 8, wherein a priority for a terminal in coverage of the at least one first terminal is higher than a priority for a terminal out of coverage of the at least one first terminal.

10. The terminal of claim 8, wherein a priority for a terminal in coverage of the at least one second terminal is higher than a priority for a terminal out of coverage of the at least one second terminal.

11. The terminal of claim 8, wherein the base station is enabled to be detected by the terminal as the synchronization reference.

12. The terminal of claim 8, in case that the information is set to the base station, the priority order for selecting the synchronization reference is identified by:
the at least one second terminal transmitting the at least one second synchronization signal has the first priority;
the GNSS has the second priority;
the at least one first terminal transmitting the at least one first synchronization signal has the third priority; and
the other terminals have the fourth priority.

13. The terminal of claim 12, wherein a priority for a terminal in coverage of the at least one first terminal is higher than a priority for a terminal out of coverage of the at least one first terminal.

14. The terminal of claim 12, wherein a priority for a terminal in coverage of the at least one second terminal is higher than a priority for a terminal out of coverage of the at least one second terminal.

* * * * *